United States Patent
Qian et al.

(10) Patent No.: US 12,302,063 B2
(45) Date of Patent: May 13, 2025

(54) ACOUSTIC DEVICE WITH CONNECTED CANTILEVER

(71) Applicant: SKYWORKS SOLUTIONS, INC., Irvine, CA (US)

(72) Inventors: You Qian, Singapore (SG); Rakesh Kumar, Singapore (SG); Guofeng Chen, Fremont, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 312 days.

(21) Appl. No.: 17/943,816

(22) Filed: Sep. 13, 2022

(65) Prior Publication Data
US 2023/0081056 A1    Mar. 16, 2023

Related U.S. Application Data

(60) Provisional application No. 63/244,848, filed on Sep. 16, 2021.

(51) Int. Cl.
| | |
|---|---|
| *H04R 17/00* | (2006.01) |
| *H04R 17/02* | (2006.01) |
| *H04R 31/00* | (2006.01) |
| *H04B 1/40* | (2015.01) |

(52) U.S. Cl.
CPC .............. *H04R 17/02* (2013.01); *H04R 31/00* (2013.01); *H04B 1/40* (2013.01); *H04R 2201/003* (2013.01)

(58) Field of Classification Search
CPC ...... H04R 17/00; H04R 17/005; H04R 17/02; H04R 17/025
See application file for complete search history.

(56) References Cited

U.S. PATENT DOCUMENTS

| | | | |
|---|---|---|---|
| 6,857,501 B1 * | 2/2005 | Han | H04R 17/00 29/594 |
| 8,259,982 B2 * | 9/2012 | Bowen | H05K 1/0271 381/372 |

(Continued)

FOREIGN PATENT DOCUMENTS

| | | | | |
|---|---|---|---|---|
| EP | 3087760 B1 * | 3/2019 | ............. | H04R 17/00 |
| FR | 3060844 A1 * | 6/2018 | ............. | B06B 1/0292 |
| WO | WO-2007026736 A1 * | 3/2007 | ............. | B06B 1/0603 |

OTHER PUBLICATIONS

Pulskamp et al. "Mitigation of residual film stress deformation in multilayer microelectromechanical systems cantilever devices." Journal of Vacuum Science & Technology B: Microelectronics and Nanometer Structures Processing, Measurement, and Phenomena 21.6 (2003): 2482-2486.

*Primary Examiner* — Ryan Robinson
(74) *Attorney, Agent, or Firm* — Lando & Anastasi, LLP

(57) ABSTRACT

A piezoelectric microelectromechanical systems (MEMS) microphone is provided comprising a substrate including walls defining a cavity and at least two of the walls defining a respective anchor region each, a piezoelectric film layer defining at least two beams, each respective beam supported by the substrate at each anchor region, the beams being free along a portion of their respective lengths and also connected at a connecting region away from the respective anchor regions; and an electrode disposed over the piezoelectric film layer. A method of manufacturing such a MEMS microphone is also provided.

20 Claims, 15 Drawing Sheets

(56) References Cited

U.S. PATENT DOCUMENTS

| | | | | |
|---|---|---|---|---|
| 8,345,904 | B2* | 1/2013 | Albach | H04R 17/00 |
| | | | | 381/322 |
| 8,680,746 | B2* | 3/2014 | Takahashi | H04R 17/00 |
| | | | | 310/323.02 |
| 8,733,176 | B2* | 5/2014 | Li | B81B 3/0086 |
| | | | | 73/715 |
| 8,896,184 | B2* | 11/2014 | Grosh | B81C 1/0015 |
| | | | | 310/368 |
| 9,029,963 | B2* | 5/2015 | Sparks | H04R 17/02 |
| | | | | 257/416 |
| 9,516,421 | B1* | 12/2016 | Loeppert | H04R 17/02 |
| 10,284,960 | B2* | 5/2019 | Grosh | H04R 7/06 |
| 10,536,780 | B2* | 1/2020 | Chen | H04R 17/00 |
| 10,602,261 | B2* | 3/2020 | Kang | H04R 17/10 |
| 10,687,147 | B2* | 6/2020 | Zou | H04R 17/02 |
| 10,763,423 | B2* | 9/2020 | Silvano De Sousa | H04R 17/00 |
| 10,999,684 | B1* | 5/2021 | Wan | H04R 17/02 |
| 11,902,740 | B2* | 2/2024 | Sun | H04R 1/2892 |
| 2009/0129611 | A1* | 5/2009 | Leidl | H04R 17/02 |
| | | | | 381/173 |
| 2017/0155035 | A1* | 6/2017 | Matsuda | G02B 27/646 |
| 2018/0234773 | A1* | 8/2018 | Kaplan | H04R 3/12 |
| 2021/0051413 | A1 | 2/2021 | Hui et al. | |
| 2021/0120346 | A1 | 4/2021 | Hui et al. | |
| 2022/0264229 | A1* | 8/2022 | Yao | H10N 30/302 |
| 2023/0199405 | A1* | 6/2023 | Umezawa | H04R 17/00 |
| | | | | 381/173 |
| 2024/0214746 | A1* | 6/2024 | Rusconi Clerici Beltrami | |
| | | | | H04R 17/00 |

* cited by examiner

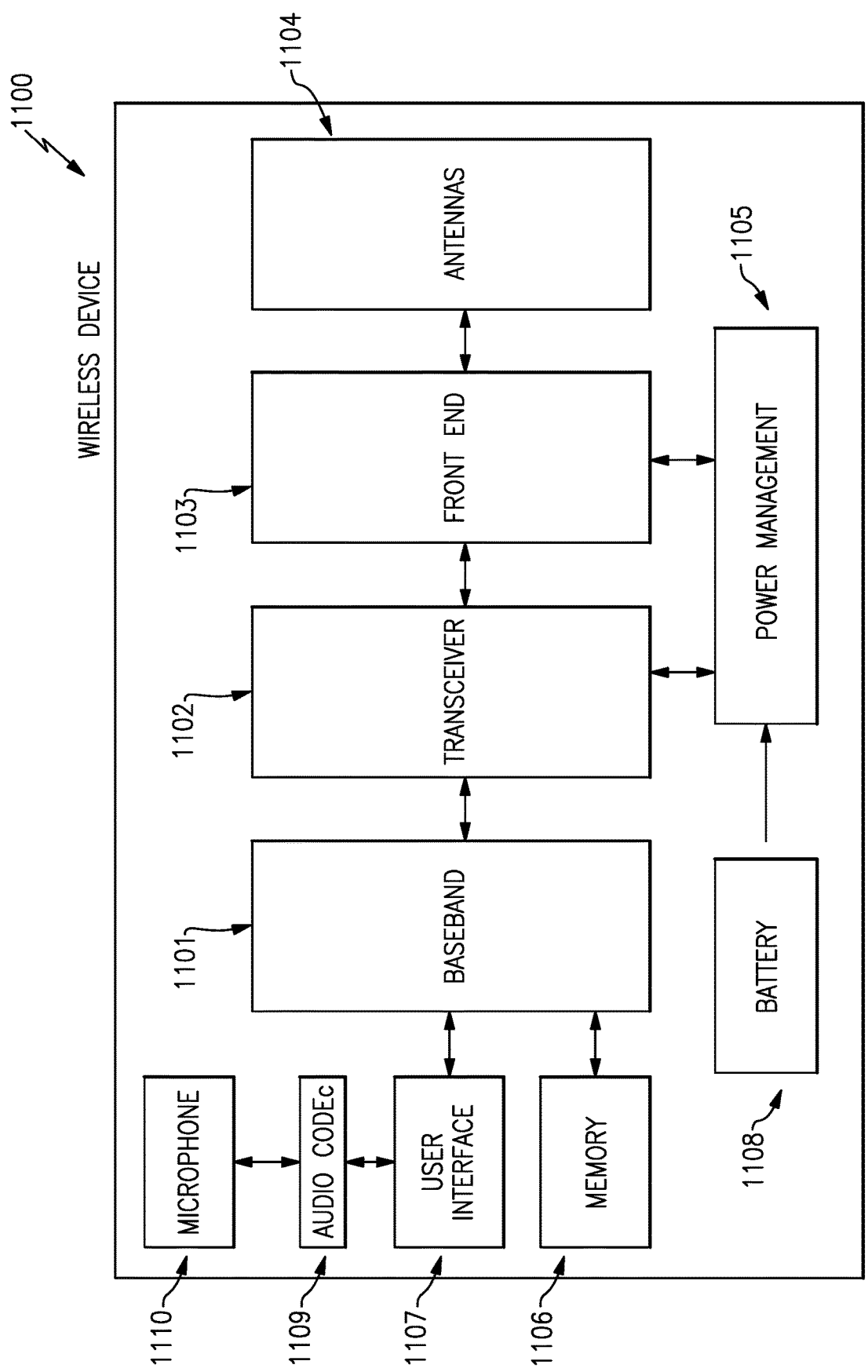

ACOUSTIC DEVICE WITH CONNECTED CANTILEVER

CROSS-REFERENCE TO RELATED APPLICATIONS

This application claims priority under 35 U.S.C. § 119(e) to U.S. Provisional Patent Application Ser. No. 63/244,848, titled "ACOUSTIC DEVICE WITH CONNECTED CANTILEVER," filed Sep. 16, 2021, the entire contents of which is incorporated herein by reference for all purposes.

BACKGROUND

Field

The present disclosure relates to a piezoelectric microelectromechanical systems (MEMS) microphone, and in particular a piezoelectric MEMS microphone with a cantilever.

Description of the Related Technology

A MEMS microphone is a micro-machined electromechanical device used to convert sound pressure (e.g., voice sound) to an electrical signal (e.g., voltage). MEMS microphones are widely used in mobile devices, headsets, smart speakers, and other voice-interface devices or systems. Conventional capacitive MEMS microphones suffer from high power consumption (e.g., large bias voltage) and reliability, for example when used in a harsh environment (e.g., when exposed to dust and/or water).

Piezoelectric MEMS microphones have been used to address the deficiencies of capacitive MEMS microphones. Piezoelectric MEMS microphones offer a constant listening capability while consuming almost no power (e.g., no bias voltage is needed), are robust and immune to water and dust contamination.

Piezoelectric MEMS microphones work on the principle of piezoelectric effect, so that they convert acoustic signals to electric signal when sound waves vibrate the piezoelectric sensor. The sound waves bend the piezoelectric film layers of a cantilevered beam or non-cantilevered beam, causing stress and strain, resulting in charges being generated in the piezoelectric film layers. The charges are converted to voltage as an output signal, by the placement of one or more electrodes on the piezoelectric film layers.

Cantilevered piezoelectric MEMS microphones have an advantage in that there is less lateral stress in the material due to the freedom of the cantilevered beams to bend. Whereas diaphragm structures have a lateral stress in the material due to being clamped around the edge, restricting the freedom.

However, in cantilevered piezoelectric MEMS microphones there is the problem of the beams bending due to intrinsic stress from manufacturing. This bending can be different in each cantilever, leading to a mismatch between the amplitude of bends in the cantilever and creating a larger air path between cantilevers, thus decreasing sensitivity. Whereas, diaphragms structures do not have this problem.

SUMMARY

According to one embodiment there is provided a piezoelectric microelectromechanical systems microphone comprising a substrate including walls defining a cavity, at least two of the walls each defining a respective anchor region, a piezoelectric film layer defining at least two beams, each respective beam supported by the substrate at each anchor region, the beams being free along a portion of their respective lengths and also connected at a connecting region away from the respective anchor regions, and an electrode disposed over the piezoelectric film layer.

In one example the at least two beams are connected by a solid material at the connecting region. This has the advantage that the mismatch between the bending of the individual cantilevers is reduced, as the cantilevers are connected.

In one example the connecting region is composed of at least one piezoelectric film layer.

In one example the connecting region is composed of alternating layers of metal and piezoelectric film.

In one example the connecting region has a width of 20 to 50 micrometers. A connecting region with a width as small as possible, while being strong enough not to break provides the advantage that the cantilevers are more sensitive to acoustic signals as they can move more freely as compared to cantilevers having wider connecting regions.

In one example the beams are connected by forming the beams and the connecting region from a single layer of piezoelectric material. This has the advantage that the cantilevers have a similar intrinsic stress from manufacturing.

In one example the beam includes a corrugated portion adjacent the connecting region. This has the advantage that stress may be released, by increasing the ability of the cantilevers to move independently.

In one example the corrugated portion is not overlaid with an electrode. This has the advantage that the corrugated portion is more flexible, whereas the presence of an electrode overlaid on the corrugated portion would result in more rigid cantilevers, thus decreasing the sensitivity of the microphone.

In one example the corrugated portion is composed of piezoelectric material. This has the advantage that the corrugated portion may be deposited during the depositing of the piezoelectric film layer(s) of the cantilevered beams.

In one example the corrugated portion may be composed of a combination of piezoelectric material and metal. This has the advantage that the corrugated portion may be deposited during the depositing of the piezoelectric film layers and electrodes of the cantilevered beams. A corrugated portion composed of a combination of piezoelectric material and metal is more rigid than a corrugated portion of similar dimensions formed only of the piezoelectric material.

In one example the corrugated portion is composed of metal. This is advantageous if it is desirable to have a more flexible corrugated portion.

In one example the corrugated portion is composed of the same material as the electrode. This has the advantage that the corrugated portion may be deposited at the same time as the one or more electrodes of the cantilevered beams.

In one example the electrode is adjacent the anchor region. This has the advantage that the electrode may be in the region of highest strain.

In one example the microphone comprises an additional piezoelectric film layer. This has the advantage that piezoelectric film layers may be chosen such that they compensate each other's stress. Optionally the microphone also has an additional two electrodes. This has the advantage that the electrodes may be on either side of the cantilevered beam, and also located in the middle of the two piezoelectric film layers, to act as a ground electrode.

In one example a distance between the edge of the anchor region of one cantilever to the edge of the anchor region of the opposite cantilever is around 780 micrometers. This has the advantage that the microphone may be larger than microphones in which the cantilevered beams are not connected in the center, such that the sensitivity of the microphone is the same as the microphones without connected cantilevered beams.

According to another embodiment there is provided a method of making a piezoelectric microelectromechanical systems microphone, the method comprising depositing a piezoelectric film layer over a substrate, etching the piezoelectric film layer to define at least two beams, each respective beam supported by the substrate at respective anchor regions, the beams being free along a portion of their respective lengths and also connected at a connecting region away from the respective anchor regions.

In one example the method further comprises forming a corrugated portion during the depositing of the piezoelectric film layer. This has the advantage that additional steps are not required to form the corrugated portion.

In one example the method of forming the corrugated portion comprises etching multiple trenches in the substrate from a front side, oxidizing the front side surface of the substrate to form an oxide layer, depositing a piezoelectric film layer over the oxidation layer, etching the silicon substrate from the back side, and etching the silicon dioxide from the back side. This has the advantage that the corrugated portion may be formed during the process of forming the cavity of the microphone. Optionally the forming of the corrugated portion further comprises depositing at least one electrode before or after the depositing the piezoelectric film layer.

In one example the method of making the piezoelectric microelectromechanical systems microphone further comprises depositing a corrugated portion after the depositing the piezoelectric film layer. This has the advantage that the corrugated portion may be composed of a material which is not the same as the piezoelectric film layer.

In one example the method of making the piezoelectric microelectromechanical systems microphone further comprises depositing at least one electrode after depositing the piezoelectric film layer.

According to another embodiment there is provided a wireless mobile device comprising one or more antennas, a front end system that communicates with the one or more antennas, and one or more piezoelectric microelectromechanical systems microphones, each microphone including a substrate including walls defining a cavity, at least two of the walls each defining a respective anchor region, a piezoelectric film layer defining at least two beams, each respective beam supported by the substrate at each anchor region, the beams being free along a portion of their respective lengths and also connected at a connecting region away from the respective anchor regions, and an electrode disposed over the piezoelectric film layer.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification but are not intended as a definition of the limits of the invention. In the figures, each identical or nearly identical component that is illustrated in various figures is represented by a like numeral. For purposes of clarity, not every component may be labeled in every figure. In the figures:

FIG. 11 is a schematic a schematic diagram of a wireless device in accordance with aspects disclosed herein.

DETAILED DESCRIPTION

Aspects and embodiments described herein are directed to a piezoelectric MEMS microphone comprising at least two beams, cantilevered from the anchor region, and connected together at a region away from the anchor region. The connection of the beams provides for a device with predictable sensitivities, arising because the beams must bend with the same amplitude, resulting in a predictable air gap into the cavity.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1A:
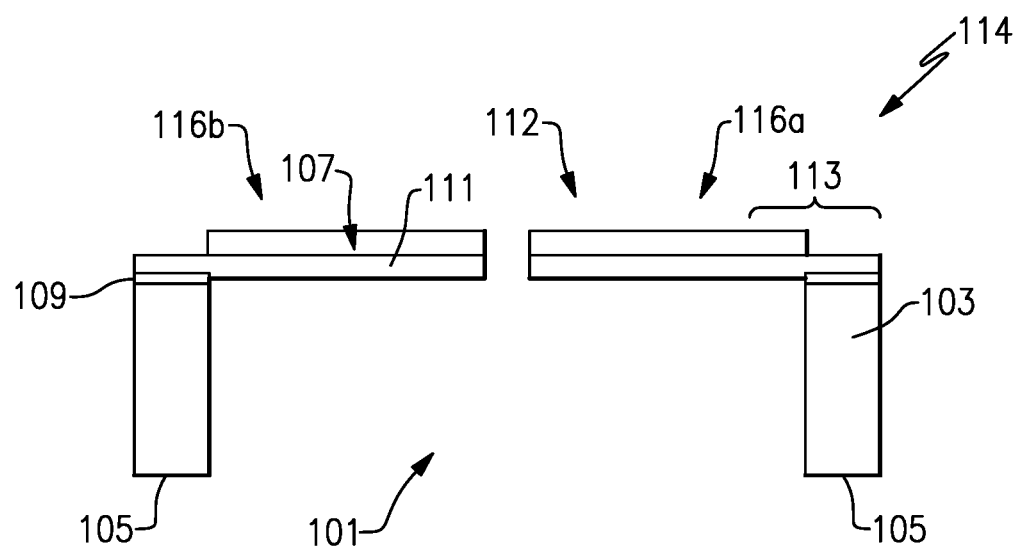
FIG. 1A is a cross-sectional view of a known microphone arrangement.
Figure 1B:
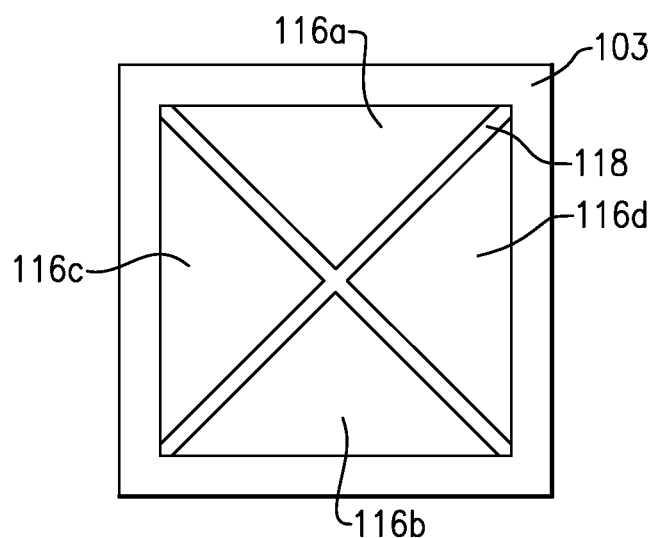
FIG. 1B is a plan view of a known microphone arrangement.

FIG. 1A shows a cross sectional view of a known implementation of a piezoelectric microelectromechanical systems (MEMS) microphone 100 (hereinafter the "microphone"). The microphone 100 is a piezoelectric MEMS cantilever microphone. The microphone 100 comprises a substrate 103. The substrate 103 is optionally made of silicon. The substrate 103 has two side walls 105, arranged such that they extend perpendicular to the length of the one or more cantilevered beams 116a, 116b. The cantilevered beams 116a and 116b are composed of one or more piezoelectric film layers 111. Two further end walls (not shown) complete the cavity on opposite sides, such that they meet the side walls at right angles, and a further structure, described in relation to FIG. 7, may be on the underside of the cavity. At least one of the side walls 105 defines an anchor region 113. The anchor region is the area where the piezoelectric film layer 111 is coupled to and supported by one of the side walls. The microphone 100 optionally comprises an insulation layer 109 disposed on a surface of the substrate 103. The insulation layer is optionally silicon dioxide. The piezoelectric film layer 111 is supported by the substrate 103 at the anchor region 113, such that the piezoelectric film layer 111 is cantilevered and extends between a fixed end 114 and a free end 112. It will be appreciated herein, that in an embodiment in which there is an insulating layer, the piezoelectric film layer will be deposited on, and in contact with the insulating layer. Therefore, the "substrate" may be used to describe silicon, or silicon with a silicon dioxide layer on its surface, or an alternative material and its oxide layer. The microphone comprises at least one electrode 107 located on the piezoelectric film layer 111. The electrode 107 may be located adjacent the anchor region 113 and may cover the entire cantilevered beam 116a and/or 116b. However, in some embodiments, the electrode may not cover the entire cantilevered beam, such that an area of the piezoelectric film layer away from the anchor region may be exposed underneath the electrode 107. In other embodiments, the electrode may be located on the underside of the piezoelectric film layer 111. It will be appreciated that FIG. 1A is a cross-sectional view, such that there may be two additional cantilevered beams, one extending over the cavity from a first end wall and the other extending over the cavity from a second end wall. In the arrangement comprising four cantilevered beams, 116a, 116b, 116c and 116d, the beams may be triangular in shape, as shown in plan view, FIG. 1B. FIG. 1B shows the gap 118 between the cantilevered beams, such that the cavity may be seen through the gap. In this figure the electrodes are not shown, for purposes of clarity. The overlap of the piezoelectric layer over the anchor region 113 is also not shown.

Figure 1C:
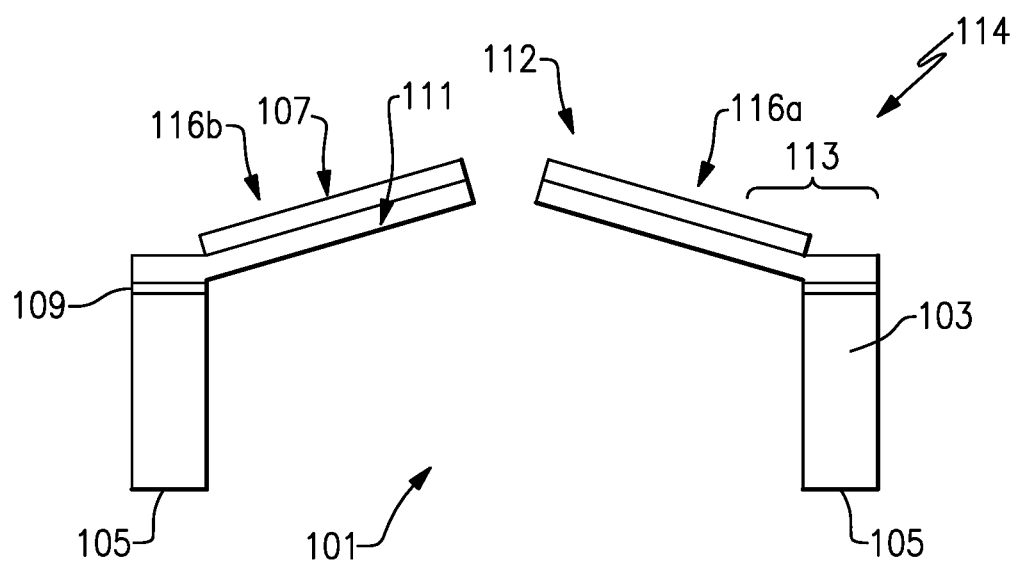
FIG. 1C is a cross-sectional view of a known microphone arrangement.
Figure 1D:
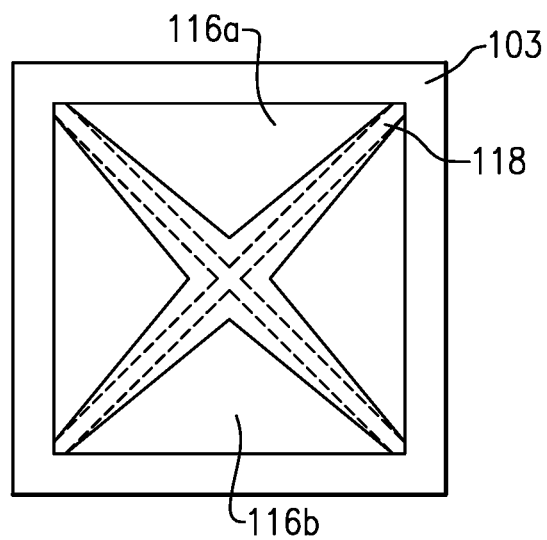
FIG. 1D is a plan view of a known microphone arrangement.

FIGS. 1C and 1D illustrate an arrangement resulting from a high stress gradient in the piezoelectric material of the cantilevers of the microphone, in which the cantilevered beam bends upwards. FIG. 1C shows a cross-sectional view of the cantilevered beam bending upwards, and FIG. 1D illustrates in plan view the consequential change in size of the gap between the cantilevered beams and into the cavity. The dashed line illustrates the outline of the gap 118 illustrated in the arrangement of FIG. 1B, showing the increase in gap size. The bending of the cantilevered beam upwards arises due to the manufacturing of piezoelectric film layers which is commonly via physical vapor deposition. The manufacturing process introduces a high stress gradient in the material so that the resultant piezoelectric film layer, which forms the cantilevered beam, may not be completely flat. The cantilevered beam may be created using a stress compensation technique, where the cantilevered beam comprises two piezoelectric film layers with different average stress such that their combination results in a cantilevered beam with no stress gradient. The bending causes an undesired larger gap which results in a decrease in sensitivity and an increase in acoustic resistance due to an increase in air flow. This decrease in sensitivity is not predictable because the extent of the bending of cantilevers is not predictable, as it arises due to residual stress from manufacturing. Aspects and embodiments disclosed herein result in an improved predictability of sensitivities of a cantilever-type piezoelectric microphone, especially in a low frequency range, providing advantages for devices in which a reliable sensitivity is desired.

Figure 2A:
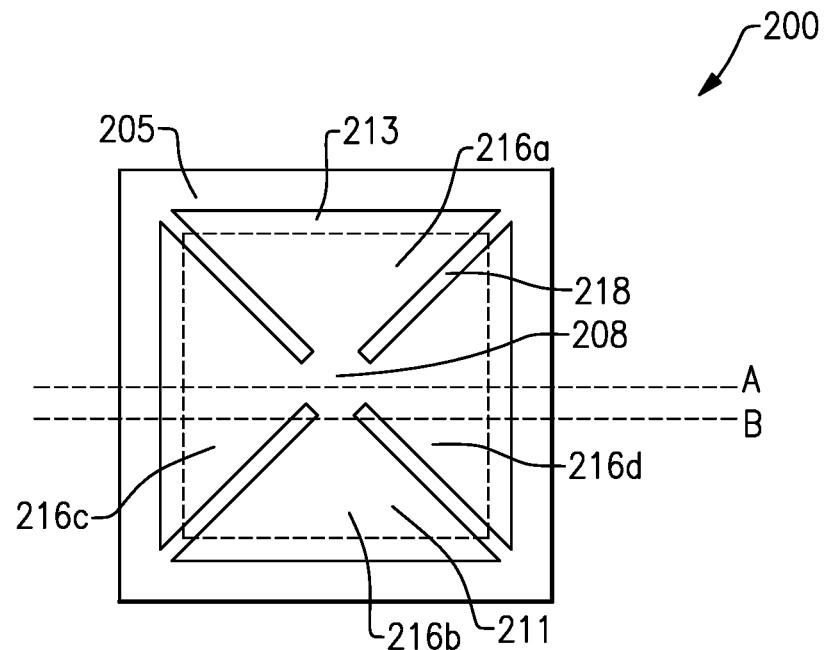
FIG. 2A is a plan view of an embodiment of a microphone arrangement as disclosed herein.
Figure 2B:
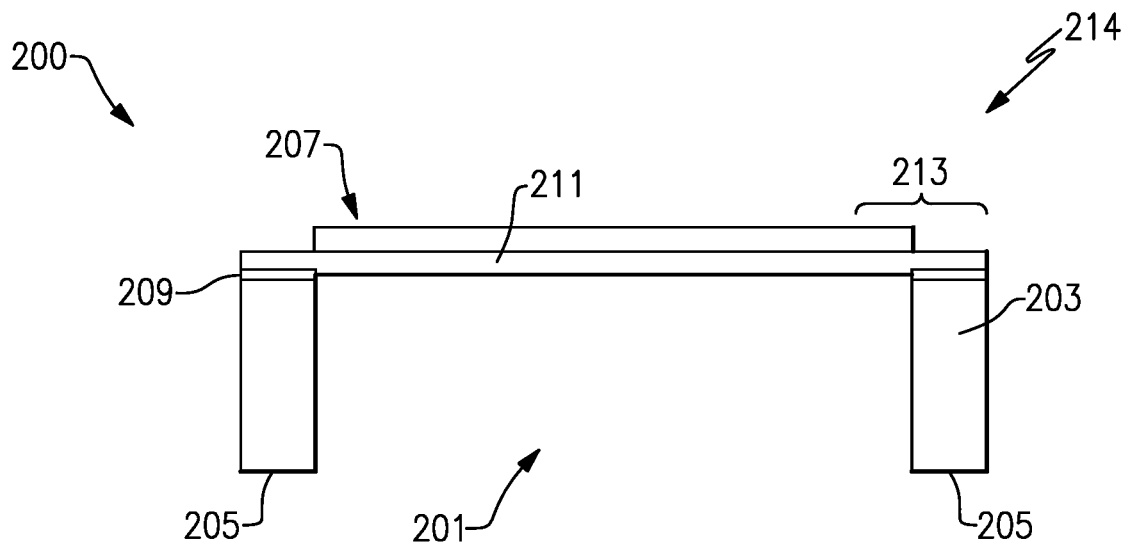
FIG. 2B is a cross sectional view of an embodiment of a microphone arrangement as disclosed herein.

FIGS. 2A and 2B show one embodiment of an improved cantilever type piezoelectric microphone. FIG. 2B illustrates a plan view of a microphone 200, in which the numbering of features is consistent with FIGS. 1A-1D. The microphone of this embodiment comprises four beams 216a-216d, wherein the beams are triangular and are composed of the same piezoelectric film layer 211. The four beams are connected at a connecting region located away from the anchor region 213. However, it will be appreciated that there may be any number of cantilevers, and the cantilevers may have any shape, for example, the cantilevers may be rectangular. The connecting of the cantilevers provides the advantage that the cantilevers are restricted from bending up and down at such a mismatch that the acoustic resistance decreases to an undesirable level. The beams are manufactured such that they are supported at an anchor region, in a similar way to that described in relation to the microphone of FIG. 1. The beams are connected at a point away from the anchor region, and thus are free along a portion of their respective lengths, i.e., they are free to move between the anchor region and connecting region. It will be appreciated that although this is not the strict definition of a cantilever, as the end of the beam is not fully free, the beams are free to move independently to each other, which is not possible in a diaphragm arrangement. The beams are therefore referred to herein as "cantilevered beams," and the arrangement as described herein is a cantilevered arrangement.

The microphone may comprise two piezoelectric film layers where one is deposited on the other. The manufacture of the piezoelectric film layers by deposition results in a stress gradient along the piezoelectric film layer, causing it to bend. Therefore, by manufacturing a cantilevered beam comprising two piezoelectric film layers the layers may be manufactured such that they have different average stress. Therefore, their combination results in a cantilevered beam with a reduced stress gradient, resulting in flatter cantilevered beams, and thus a more sensitive microphone.

The four beams may be formed from a single sheet of piezoelectric film, into which at least two slits are etched extending from the corners of the piezoelectric film towards the center of the piezoelectric film without meeting, such that a region remains in the center of the piezoelectric film, connecting the four beams. Therefore, the individual four beams do not need to be merged after fabrication and the cantilevered beams have similar intrinsic residual stress from manufacturing process. However, it will be appreciated that the four beams may be formed separately and their tips merged together afterwards. The one or more piezoelectric film layers may be formed from aluminum nitride, however it will be appreciated that any suitable piezoelectric material may be used, such as PZT, ZnO, PVDF, PMN-PT, scandium-doped aluminum nitride or others.

The four beams are supported at the anchor region 213 of the four cavity walls 205. In this embodiment, the gaps 218 between the beams 216a-216d do not extend the entire diagonal of the piezoelectric film layer, such that the piezoelectric film layer is not composed of separated cantilevered beams with free ends. It will be appreciated that FIG. 2A is for illustrative purposes only, and the gaps and connecting region 208 sizes are not to scale. Furthermore, the shape of the piezoelectric film layer, and the shape of the gaps, and thus beams, can be any size. For example, the connecting region 208 may not be located over the center of the device. It will be appreciated that although illustrated as comprising four beams, the microphone may comprise two beams, or any other number of beams. The dashed line shows the overlap of the piezoelectric film layer 211, and thus the beams 216a-216d, with the cavity walls 205, such that the cavity can be seen through the gap 218, on the underside of the beams. The area outside of the dashed line is the anchor region 213, defined by the section at which the piezoelectric film layer 211, and thus the beams 216a-216d, are supported by the substrate walls. It will be noted that in an embodiment in which there is an insulating layer 209, the piezoelectric film layer 211 may be supported directly by the insulating layer 209 and therefore supported by the substrate walls 205.

FIG. 2B illustrates a cross-sectional view of the microphone, taken along the line A of FIG. 2A. As shown, as a cross-sectional view taken along the connected region, the piezoelectric material 211 is shown with no gaps. However, it would be appreciated that a cross sectional view taken along a line which crosses the gaps 218, the view would show at least one gap 218 from the cavity side to the opposite side of the cavity 201. In FIG. 2B one electrode 207 is shown overlaying the piezoelectric film layer 211. In this embodiment the electrode 207 covers the entirety of the piezoelectric film layer. However, as described in relation to FIGS. 3A-3C, the electrode may be designed such that it does not cover the entirety of the piezoelectric film layer. The electrode may be composed of any suitable conductive material, such as molybdenum or titanium. The microphone may comprise an insulating layer 209 located between the piezoelectric film layer 211, and the cavity walls 205. As described above, the cavity walls 205 may be composed of silicon, and the insulating layer 209 may be composed of silicon dioxide.

The connection of the beams 216a-216d has the advantage that the bending of each of the beams has the same amplitude, and therefore there is better control of the gap 218 between the beams. This avoids the problem of an increased gap size, as described above. By restricting the cantilever bending, the acoustic resistance is constant, or substantially constant.

The gaps in the piezoelectric film layer help to release residual stress in the device. Therefore, embodiments in which cantilevers are connected are advantageous over a microphone having a membrane without a gap.

Connection of the beams reduces movement of each of the beams for each acoustic wave that hits it, and therefore reduces the stress on the piezoelectric material, resulting in a lower output voltage, and a less sensitive device. The microphone also has an increased resonant frequency, due to a more rigid structure. Therefore, a larger device is used than for a non-joined cantilever structure, shown in FIGS. 1A-1B, to match the sensitivity of the non-joined cantilevered structure. The distance between the edge of the anchor region of one cantilever to the edge of the anchor region of the opposite cantilever is around 780 micrometers in some embodiments, although other distances may be utilized in other embodiments.

Figure 3A:
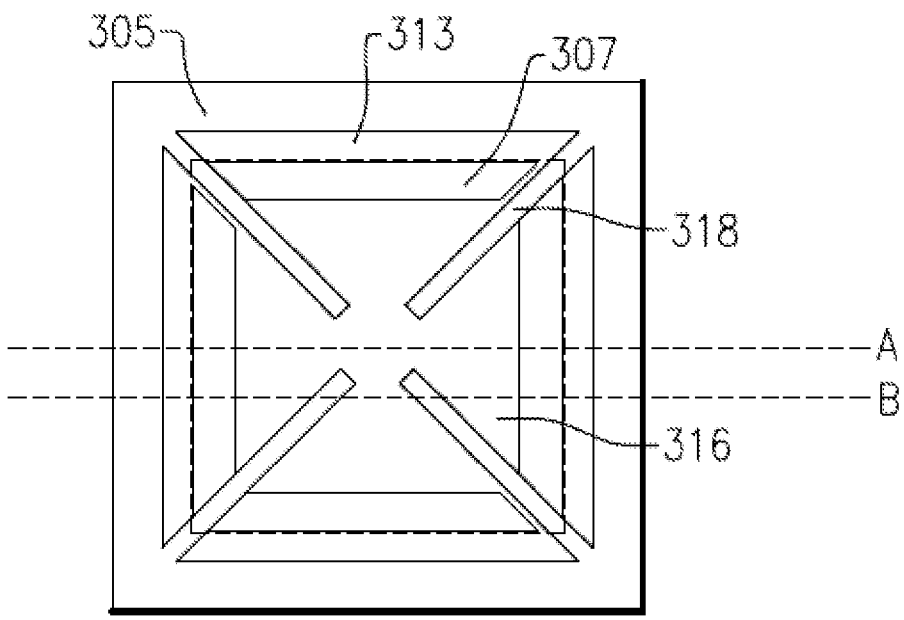
FIG. 3A is a plan view of an electrode arrangement according to aspects disclosed herein.
Figure 3B:
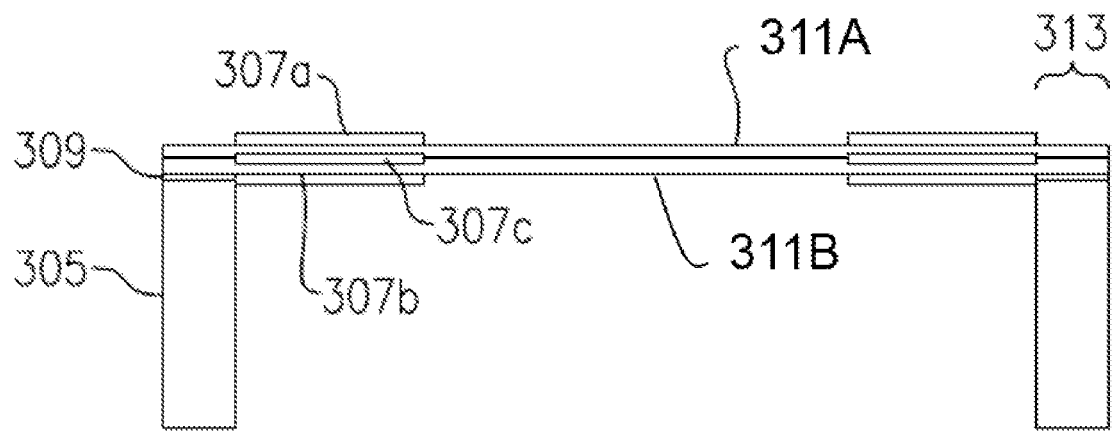
FIG. 3B is a cross-sectional view of an electrode arrangement according to aspects disclosed herein.

FIGS. 3A-3B illustrate an embodiment in which the electrode 307, as described herein, is designed to be adjacent the anchor region 313. The anchor region is defined by the dashed line shown in FIG. 3A, which illustrates the outline of the cavity wall, such that outside of the dashed line, the piezoelectric film layer is overlapping the cavity wall 305. FIG. 3A is a plan view of the microphone. In some embodiments, the electrode 307 does not cover the anchor region 313, as there is no bending in this region, and thus no electric charge to collect. However, it will be appreciated that due to manufacturing tolerances, the electrode may have a small overlap with the cavity wall 305. As shown, the electrode does not cover the entirety of each beam 316, instead the electrode is a truncated triangle, such that the piezoelectric film layer 311 is exposed beneath the electrode 307.

FIG. 3B is a cross-sectional view of the microphone, taken along the line A of FIG. 3A. As shown, in this embodiment there are three electrodes. In some embodiments there may be two piezoelectric film layers, such that an electrode may be positioned between the two piezoelectric film layers. FIG. 3B illustrates an embodiment in which there are three electrodes 307a, 307b and 307c. The electrodes are arranged such that electrode 307a is arranged on the piezoelectric film layer 311a, and electrode 307b is arranged on the piezoelectric film layer 311b, and electrode 307c is arranged between the two piezoelectric film layers 311a and 311b. Together the piezoelectric film layer(s) and electrode(s) form a cantilevered beam 316. The insulation layer 309 provides insulation between an electrode, disposed on the cavity side of the piezoelectric film layer, and the silicon substrate 303. Therefore, in this embodiment, the piezoelectric film layer 311 is deposited on the insulating layer 309. It will be noted that any suitable conductive material can be used for the one or more electrodes, for example, molybdenum or titanium. The one or more piezoelectric film layers are formed from aluminum nitride, however it will be appreciated that any suitable piezoelectric material may be used, such as PZT, ZnO, PVDF, PMN-PT, scandium-doped aluminum nitride or others.

Figure 4A:
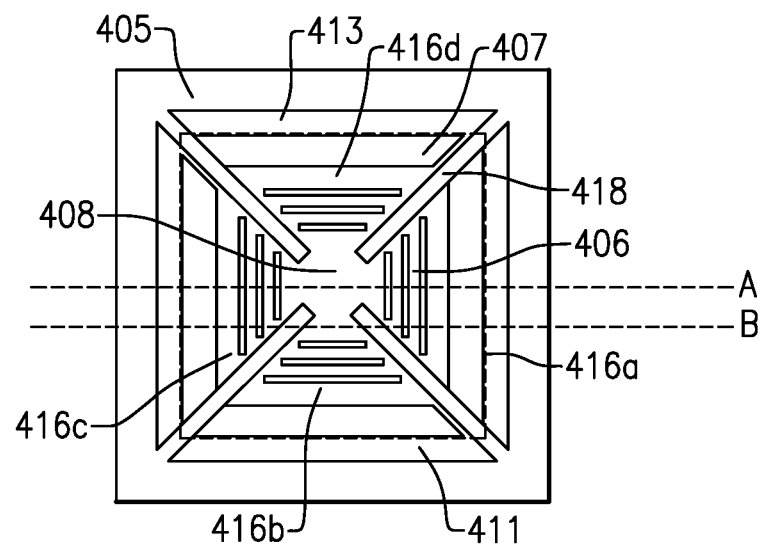
FIG. 4A is a plan view of a microphone with corrugated portions according to aspects disclosed herein.
Figure 4B:
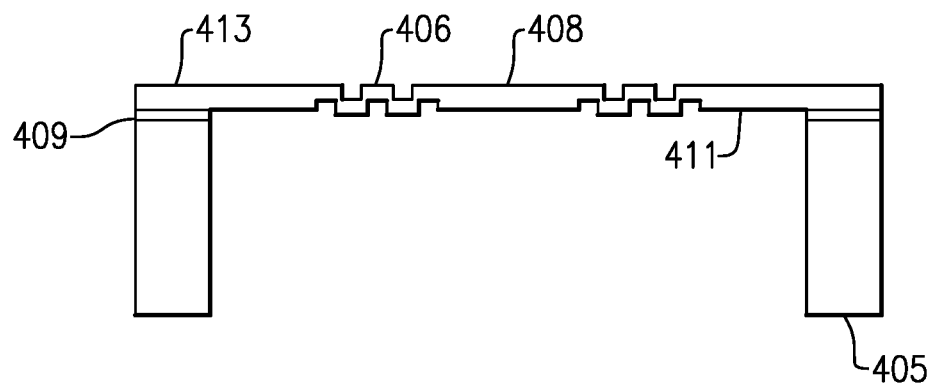
FIG. 4B is a cross-sectional view of a microphone with corrugated portions according to aspects disclosed herein.

FIGS. 4A and 4B show another embodiment. FIG. 4A shows a plan view of this embodiment of the microphone. The features are numbered to correspond with the embodiments of FIGS. 2A-2B and FIGS. 3A-3B described herein, and it will be appreciated that the features are the same as those described herein. As shown in FIGS. 4A and 4B, the microphone comprises a corrugated portion 406. Herein "corrugated" is used to define a structure comprising a series of furrows and peaks perpendicular to the surface of the cantilevered beams. The corrugated portion may increase the flexibility of the cantilevered beams, thus relieving stress in the cantilevered beams. The corrugated portion may be any suitable material, for example the corrugated portion may be composed of piezoelectric film layer, or metal, or alternating layers of piezoelectric film layer and metal. The corrugated portion is preferably of a size such that the jointed cantilever structure has sufficient strength that it does not break in use. As illustrated, optionally the corrugated portion 406 does not cover the connecting region 408, and instead is located on each cantilevered beam, such that there are four separate corrugated portions 406 on each beam 416a-416d. Optionally, the corrugated portion 406 extends the entire width of each beam to the gaps 418.

The microphone of this embodiment may have any of the electrodes as described herein. The microphone of this embodiment may include electrodes as described in relation to FIGS. 3A-3B, in which the electrodes 407 are adjacent the anchor region 413, and correspond to the shape of the beams 416a-416d but are truncated, such that the piezoelectric layer 411 is exposed and not overlaid by electrodes 407. In some embodiments, the electrodes 407 do not extend to the corrugated portion 406, as this would affect the corrugated portions ability to move to achieve the desired effect, as described later. Although not illustrated here, as described in FIG. 3B, there may be three layers of electrodes, such that there is one electrode on the cavity side of the piezoelectric film layer on the cavity side. There is additionally an electrode located between the two piezoelectric film layers, and an additional electrode located on the piezoelectric film layer on the opposite side of the cavity.

FIG. 4B illustrates a cross-sectional view of the microphone, taken along line A of FIG. 4A, with the corrugated portion 406, although it will be appreciated that the electrodes are not shown in this figure for clarity. As described above, there may be three layers of electrodes in the microphone, adjacent each of the anchor regions 413. The microphone may comprise one or two piezoelectric film layers 411.

A continuous piezoelectric film layer, such as in a diaphragm microphone structure, introduces stress, as the material is unable to move freely. The connecting region 408 may introduce this stress due to the restriction of movement. The corrugated portion 406 may provide for relief of this stress by providing for easier flexing (expansion or contraction) of the piezoelectric film layer than a piezoelectric film layer without the corrugated portion 406. The corrugated portion may be a corrugated material, or it may be a spring, or other suitable designs. The corrugated portion allows movement in the piezoelectric film layer, allowing it to be compressed or stretched. This freedom of movement allows the stress to be released, thus improving the predictability of the sensitivity of the microphone.

Figure 5A:
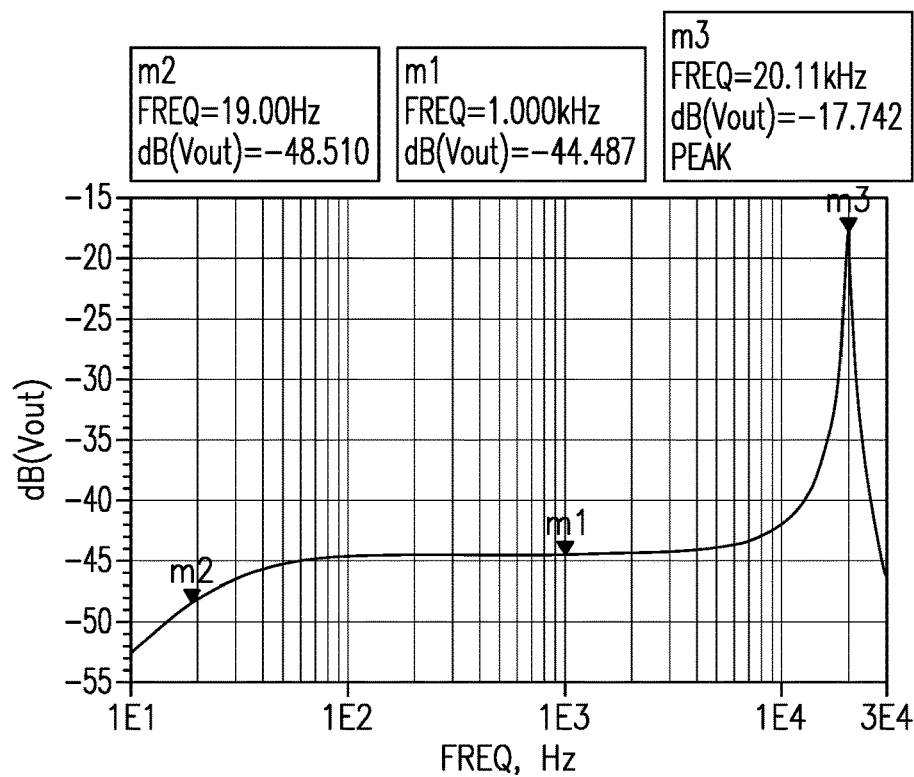
FIG. 5A is a graph of sensitivity vs. frequency of an embodiment of a microphone as disclosed herein.
Figure 5B:
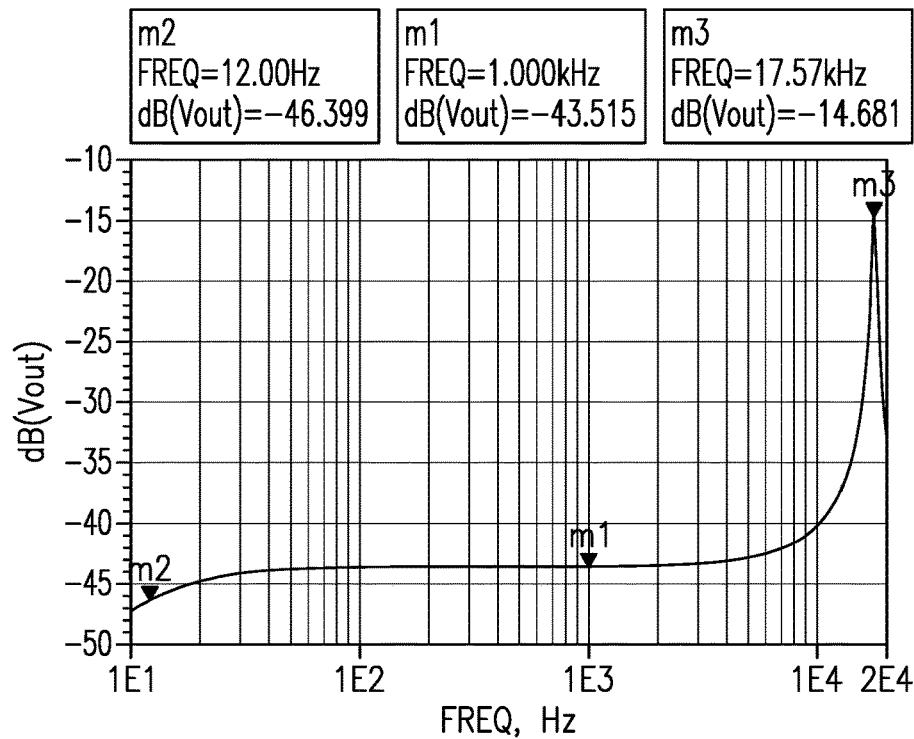
FIG. 5B is a graph of sensitivity vs. frequency of a known arrangement.
Figure 5C:
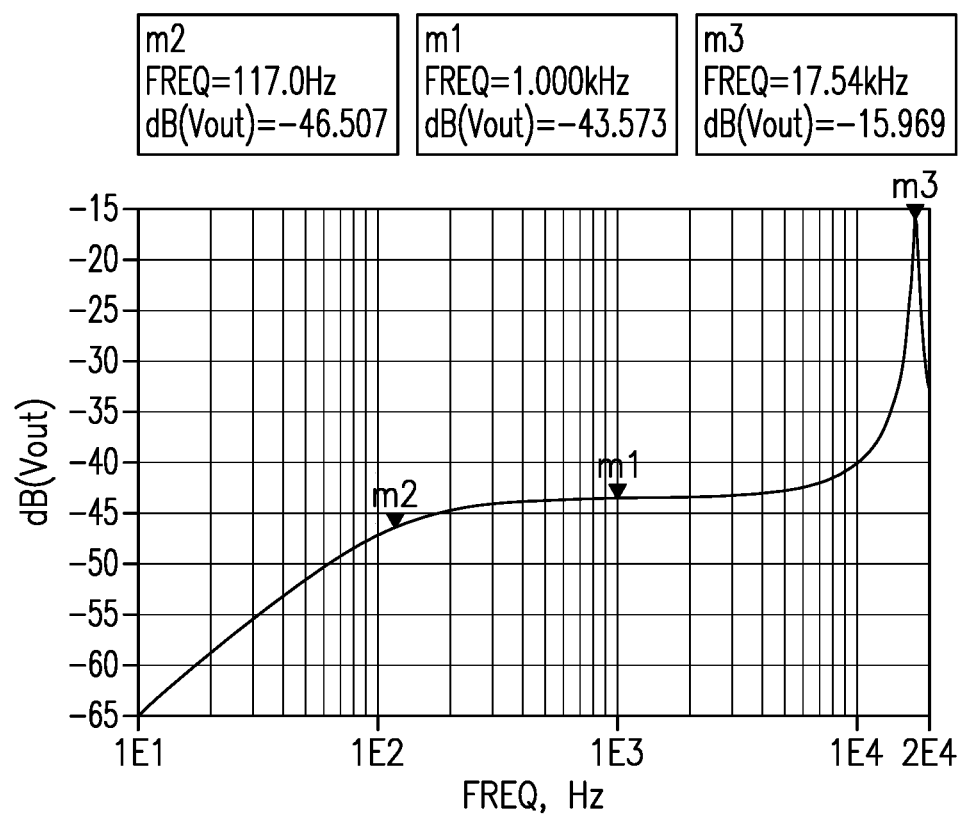
FIG. 5C is a graph of sensitivity vs. frequency of a known arrangement.

FIG. 5A illustrates the performance of one embodiment, wherein the distance between the edge of the anchor region of one cantilever to the edge of the anchor region of the opposite cantilever is around 780 micrometers, and the cantilevers are connected in the center of the device. FIG. 5B illustrates the performance of the arrangement of FIGS. 1A-B, where the cantilevers are not connected and have a 0 micrometer bend, and there is no mismatch. In this arrangement the distance between the edge of the anchor region of one cantilever to the edge of the anchor region of the opposite cantilever is around 740 micrometers. FIG. 5C shows the performance of a typical arrangement of FIGS. 1A-1B, where the cantilevers are not connected, and the size of the device is the same as in the arrangement of FIG. 5B. In this arrangement there is a mismatch in bending of the cantilevers, with the graph showing the results due to a typical mismatch of 2 micrometers between the bending of the free ends of the cantilevers. This mismatch may arise due to manufacturing tolerances, resulting in cantilevers with intrinsic stress. In the graphs shown, $m_2$ is 3 dB lower than $m_1$ and therefore the location of $m_2$ shows the 3 dB roll-off point of the devices. Comparing FIGS. 5B and 5C, it can be seen that for a typical 2 micrometer mismatch in a microphone with separate cantilevers, there is a 3 dB roll off point of above 100 Hz (shown by $m_2$ in FIG. 5C). Whereas in a flat cantilever, this 3 dB roll of is around 12 Hz, shown by $m_2$ in FIG. 5B. FIG. 5C also shows that for the device in which the cantilevers are mismatched, the sensitivity decreases more rapidly in low frequencies. Therefore, the performance of the microphone varies significantly with a mismatch in cantilevers, due to the increase in air flow into and out of the cavity. Although a comparison between FIGS. 5A and 5B shows that the sensitivity of the associated embodiment is decreased by 1 dB due to the connected cantilever structure, for some devices a tighter low frequency control is preferable over sensitivity. A device according to embodiments disclosed herein may have a constant acoustic resistance due to a constant gap size between cantilevers and a constant 3 dB roll off point. As shown in FIG. 5A, this 3 dB roll-off point may be around 19 Hz. In each of FIGS. 5A, 5B, and 5C $m_3$ shows the resonant frequency of the device.

Figure 6:
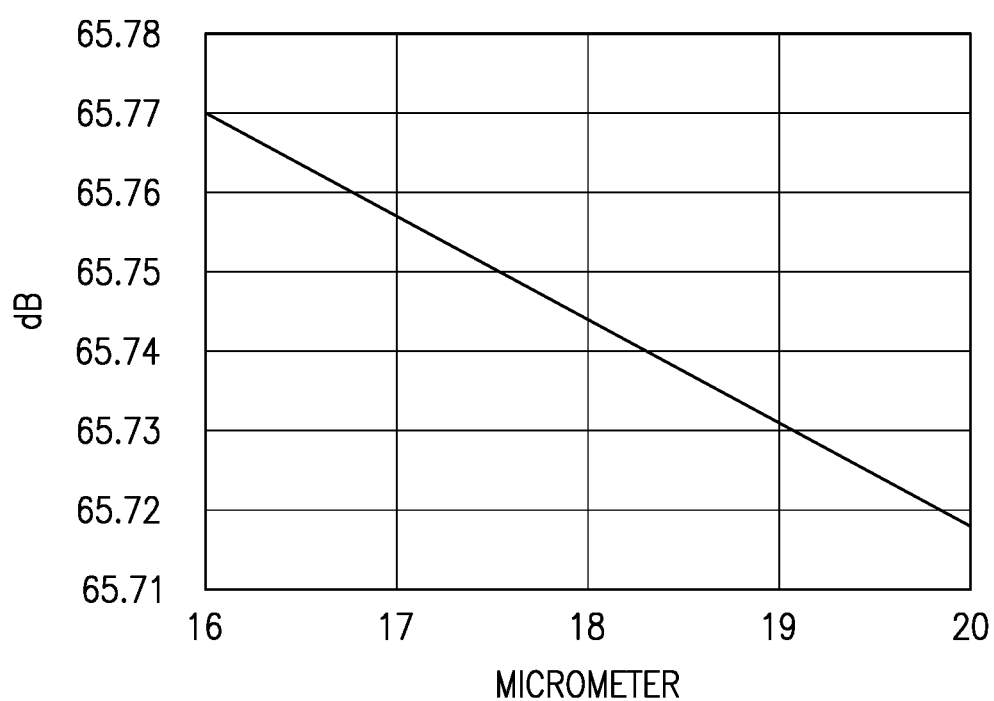
FIG. 6 is a graph of sensitivity vs. width of a connecting region according to aspects disclosed herein.

As described above, the width of the connecting region in the embodiment in which the connecting region is composed of piezoelectric material is between around 20 and 50 micrometers. A smaller width of the connecting region may provide for the connected cantilever structure to be less rigid, resulting in a higher sensitivity due to the cantilevers ability to respond more easily to acoustic signals. However, it will be noted that there is a limit on how small the area of the connecting region 408 may be, as it should be strong enough to not break when the cantilevers move due to exposure to acoustic signals. It will be appreciated that a connecting region with a larger area is stronger than a connecting region with a smaller area. In an embodiment in which the connecting region is composed of a material other than piezoelectric material, the width of the connecting region may be less than 20 micrometers. FIG. 6 shows the results of a simulation of a connecting region where the width of the piezoelectric connecting region is less than 20 micrometers. The simulation shows the increase in signal-to-noise ratio with the decrease in width of the connecting region. As shown, a connecting region with a width of 20 micrometers results in a 65.71 dB signal-to-noise ratio, whereas a connecting region with a width of 16 micrometers results in a 65.77 dB signal-to-noise ratio. It will be noted that this trend will also be applicable to any other material.

Figure 7:
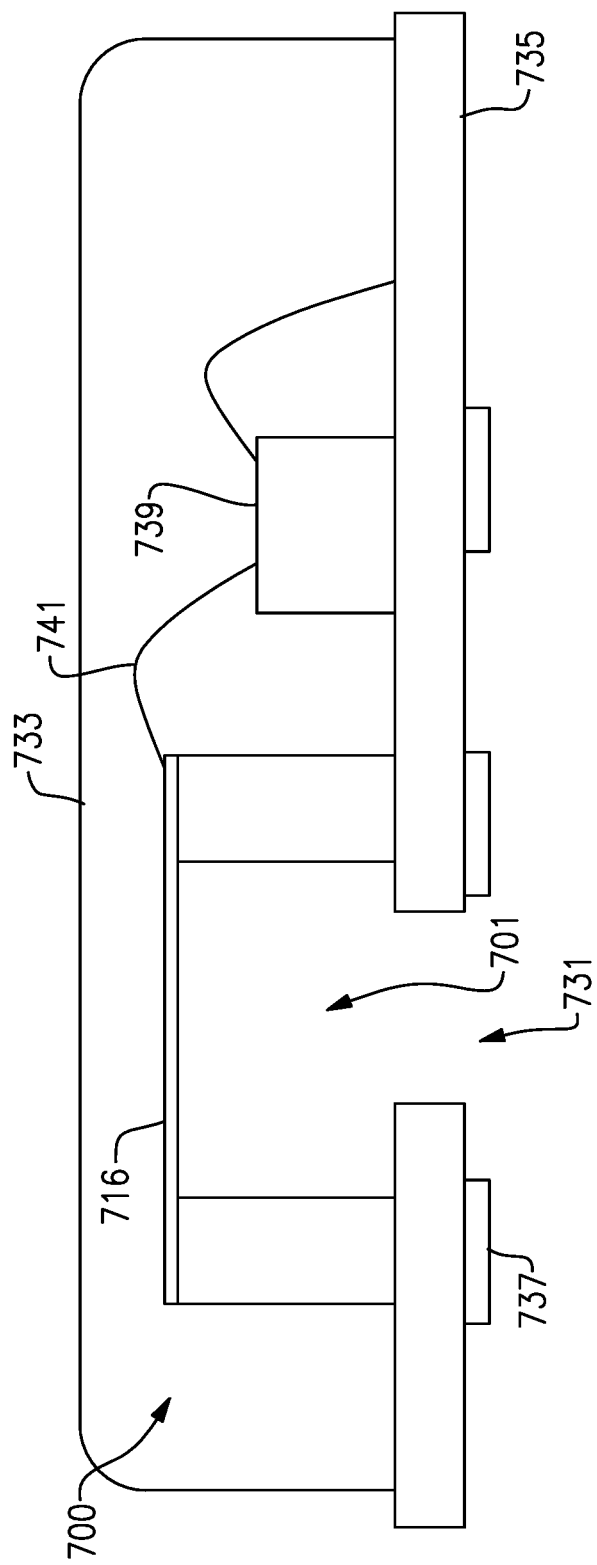
FIG. 7 is a cross-sectional view of a microphone arrangement according to aspects disclosed herein.

FIG. 7 illustrates a cross-sectional view of a microphone arrangement. It will be appreciated that this is an example embodiment for illustrative purposes, and the microphone can be included in a variety of different arrangements. As illustrated, the microphone 700 of FIG. 7 is located within a cap 733. The cap may be flexible or rigid and may be any suitable material, such as a metallic material. The cap creates a seal with a substrate 735 (for example, a printed circuit board), such that air only flows into and out of the arrangement via a sound inlet 731. There is no gap shown in the beam 716 in FIG. 7, however, it will be understood that the microphone shown is as described herein such that there are gaps in the piezoelectric film layer. The substrate 735 may be any suitable material. The cap 733 may also mitigate electromagnetic interference. Sound waves enter the arrangement, causing the cantilevered beam 716 to bend and produce voltage due to the piezoelectric effect, as described herein. The arrangement comprises at least one solder pad 737 such that the microphone arrangement may be soldered to external devices, not shown here. The microphone arrangement further comprises an application specific integrated circuit chip/die ("ASIC") 739. The MEMS microphone is electrically connected to the ASIC 739 by wire bonding 741. Although not shown, it will be appreciated that the wire bonding may be connected to the one or more electrodes of the microphone, as described herein.

FIG. 7 is a cross-sectional view of the microphone arrangement, such that the one or more solder pads, substrate 735, MEMS microphone 700, ASIC 739, and cap 733 extend into the page such that they are three-dimensional, as described in relation to other embodiments disclosed herein.

Manufacturing of a Piezoelectric MEMS Microphone

The method of manufacturing of an embodiment of the piezoelectric MEMS microphone will now be described. Although this technique is described in relation to the microphone described herein, it is compatible with any piezoelectric MEMS microphone. It will be appreciated that the features of embodiments of the microphone as described in the above description may be implemented here, such as but not limited to the materials and dimensions.

FIGS. 8A-8F show cross-sectional views of structures illustrating steps of a first method of manufacturing a piezoelectric MEMS microphone. It will be appreciated that although described in relation to an embodiment disclosed herein, in which the microphone comprises the connected cantilever structure of FIG. 4A, in which the microphone comprises at least one corrugated portion, and three layers of electrodes, it will be appreciated that this method may be used for any piezoelectric MEMS microphone devices. It will be noted that the figures are for illustrative purposes only, and the features are not to scale. The cross-sectional views are taken along the line B shown in FIGS. 2A, 3A and 4A, such that the cross-sectional views shows two gaps, and two corrugated portions. The microphone as described in the embodiments herein, may be created in any shape in the plane of the surface of the silicon, such as rectangular or triangular. It will be noted that although only two cavity walls are shown in the cross-sectional views, in an embodiment with a rectangular cavity, there will be an additional two walls, such that the walls form right angles.

Figure 8A:
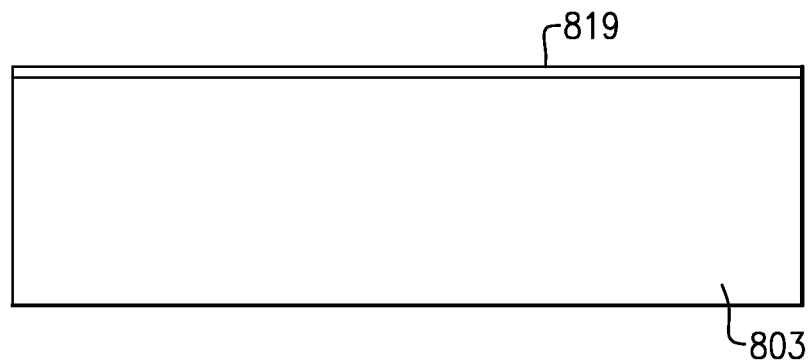
FIG. 8A-8E are cross-sectional views of steps in a method for making a microphone according to aspects disclosed herein.

FIG. 8A shows the step of oxidizing the top layer of the substrate 803. The oxidation process may include thermal oxidation. In the embodiment in which the substrate is formed from silicon, the oxidized layer 819 will be composed of silicon dioxide. The oxidized layer formed will be dependent on the material of the substrate. The layer of oxide may be any thickness sufficient to protect the necessary parts from etching in the steps described hereafter. Alternatively, the oxide layer may be deposited on the substrate, instead of being formed by oxidation of the substrate.

Figure 8B:
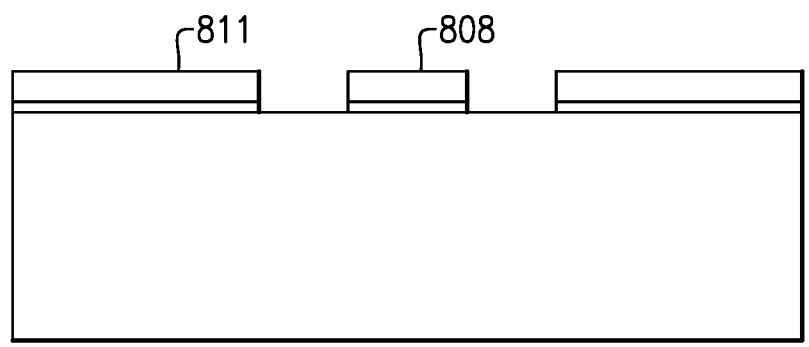

FIG. 8B shows the step of defining the beams in the piezoelectric layer. It will be noted that the cross-sectional view illustrates the beam as two-dimensional, however, the beam extends parallel to the surface of the substrate, such that it is three-dimensional, and may have a rectangular or a triangular cross section from a plan view. As noted above, the following method may be repeated to define the two end walls, and the other edges of the beam. As illustrated, at least one piezoelectric film layer 811 is formed on the front side of the silicon dioxide layer 819, such that the silicon dioxide 819 layer separates the substrate 803 and the piezoelectric film layer 811. The at least one piezoelectric film layer is formed by a physical vapor deposition. The beams are defined by anisotropic etching of the piezoelectric layer, or layers, and the layer of silicon dioxide 819 on the back side of the piezoelectric material, from the front side of the device. It will be appreciated, with reference to the device as shown in FIGS. 2A, 3A and 4A, that in the embodiment in which there are four connected cantilevered beams (216, 316, 416) the piezoelectric film layer is etched to include four slits extending from anchor region, at which the piezoelectric film layer overlaps the cavity wall, towards the center of the piezoelectric layer. However, the slits do not extend into the center, such that none of the four slits touch each other. The distance between the ends of the slits, at the center, is chosen depending on the strength of the connected cantilever structure required. The width of the connecting region may be any width, such as for a connecting region comprising a piezoelectric material the connecting region may be around 20 to 50 micrometers. The arrangements of the slits can be seen in the plan view of FIGS. 2A, 3A and 4A. In a cross-sectional view taken along the line B of these figures, there are two slits shown, and thus their etching is described herein, in relation to the figures. The etches are perpendicular to the surface of the piezoelectric film layer, and their width will depend on whether the embodiment comprises a corrugated portion, as described in FIG. 8D. In the absence of a corrugated portion, or in an embodiment in which the corrugated portion is formed from the piezoelectric film layer, the etches may be around 1 micrometer in width. However, it will be appreciated that the etches may be any thickness suitable for achieving the desired sensitivity. The section of piezoelectric film layer remaining in between the two etches shown in FIG. 8C forms the connecting region 808. It will be noted that for illustrative purposes additional features in the embodiment, such as electrodes, are not included in the figures. However, it will be noted that these may be deposited on and/or between the piezoelectric layers, during the step of defining the beams. Any suitable conductive material can be used for the electrodes, for example, molybdenum or titanium, or others.

Figure 8C:
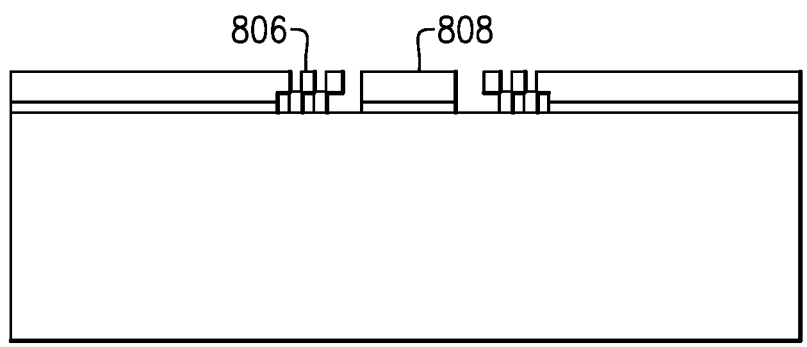
Figure 8D:
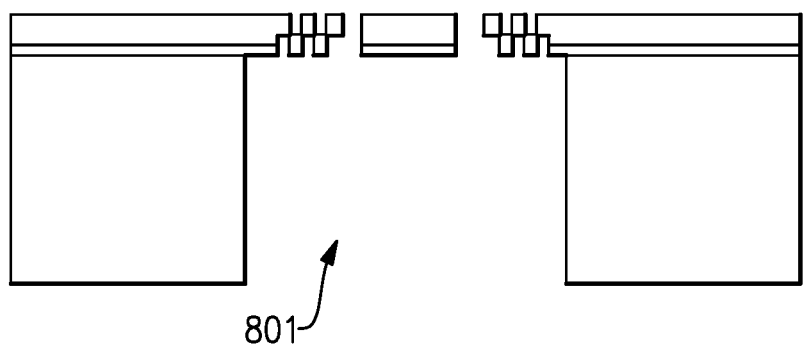

FIG. 8C shows the step of forming a corrugated portion 806. In an embodiment in which there is no corrugated portion, this step is not present. The corrugated portion 806 may be composed from any suitable material. In some embodiments the corrugated portion may be composed from the piezoelectric film layer. In these embodiments, the piezoelectric film layer may be etched to form the corrugated portion 806. In some embodiments the corrugated portion 806 may be composed of a different material to that of the piezoelectric film layer. In some embodiments the corrugated portion may be composed of piezoelectric material and metal. In these embodiments a material may be deposited onto a portion of the silicon substrate 803 exposed by the etching from the front side of the device, as illustrated in FIG. 8C. It will be noted that the entirety of the exposed silicon will not be covered in material to be corrugated, as shown in FIG. 8D, to ensure there is a gap to define the cantilevered beam. This material can subsequently be etched to form the corrugated portion. The corrugated portion may be a spring, or other suitable design to provide the required freedom of movement to the cantilevered beams.

FIG. 8D shows the step of forming the cavity 801. The cavity is etched from the back side of the device, using an anisotropic etch. The cavity is etched by silicon etching, such that the silicon dioxide layer between the beam and substrate is not etched.

Figure 8E:
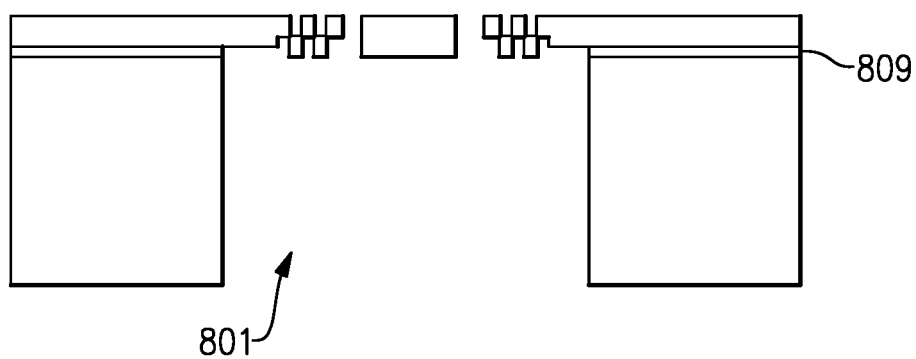

FIG. 8E shows the final step of the etching process. In this step an isotropic etch is used to remove the silicon dioxide layer on the cavity side of the piezoelectric film layer. Any suitable isotropic etchant may be used. The layer of silicon dioxide located between the piezoelectric film layer 811 and the substrate 803 is not etched away, due to its protection by the remaining silicon, which the silicon dioxide etching does not remove. This remaining layer acts as an insulating layer as described herein. After the removal of the silicon dioxide layer on the cavity side of the beam, the beam will bend about its fixed end according to the stress of the piezoelectric film layer.

FIGS. 9A-9E show cross-sectional views of structures illustrating steps of a second, alternative, method of manufacturing a piezoelectric MEMS microphone. Although the method of manufacture is described in relation to an embodiment disclosed herein, in which the microphone comprises the connected cantilever structure of FIG. 4A, in which the microphone comprises at least one corrugated portion, and three layers of electrodes, it will be appreciated that this method may be used for any piezoelectric MEMS microphone devices. It will be noted that the figures are for illustrative purposes only, and the features are not to scale. As noted in the embodiment illustrated in FIGS. 8A-8E, although the beam and cavity are shown as two-dimensional due to the cross-sectional view of the figure, the beam and cavity are three-dimensional. As in FIGS. 8A-8E, the cavity may have any shape in the cross section of the plan view, and the beams may also have any shape in the cross section of the plan view.

Figure 9A:
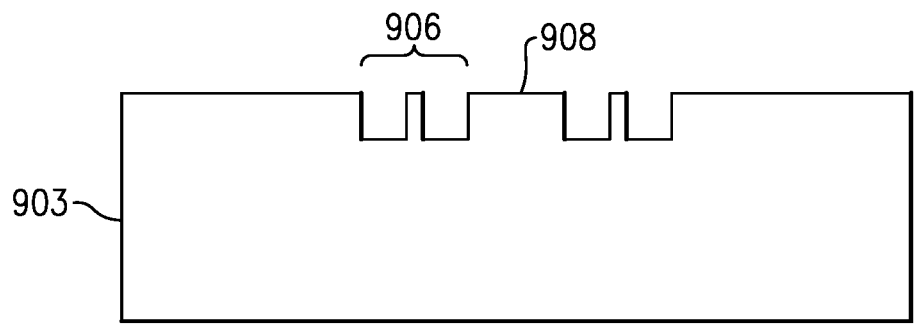
FIG. 9A-9E are cross-sectional views of steps in a method for making a microphone according to aspects disclosed herein.

FIG. 9A shows the etching of a substrate 903 from the front side of the device. In this method the substrate is etched to form trenches which define the corrugated portion 906. The etching process may be deep reactive-ion etching (DRIE), an anisotropic etch process, forming walls around 90 degrees to the surface of the substrate. The etching process may be any suitable anisotropic etching process. In the figures there are four trenches etched, two for each corrugated region 906, leaving a section in the middle without trenches, which will define the connecting region 908. However, it will be noted that there may be any number of trenches formed, of any width and depth. In an embodiment in which the connecting region is composed of a piezoelectric material, the connecting region may be 20-50 micrometers in width. The substrate 903 may be composed of silicon.

Figure 9B:
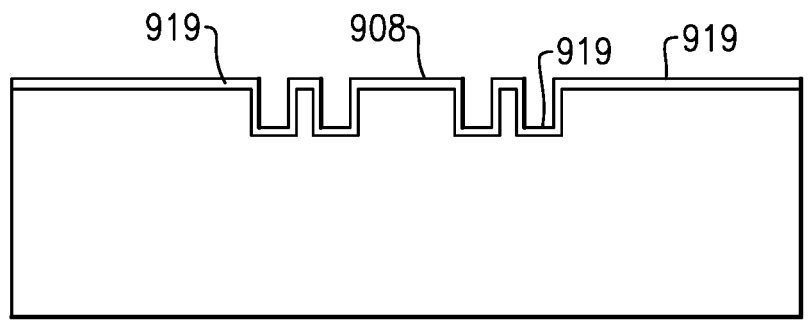

FIG. 9B shows the oxidizing of the substrate, as described in relation to FIG. 8A to form an oxide layer 919. The oxide layer may be silicon dioxide. As described in relation to FIG. 8A alternatively an oxide layer may be deposited on the substrate, instead of oxidizing the substrate. The trenches in the corrugated portion 906 may be sufficiently wide such that they are not completely filled with oxide 919, and instead are lined with an oxide layer 919, such that there are still gaps in the structure, as shown.

Figure 9C:
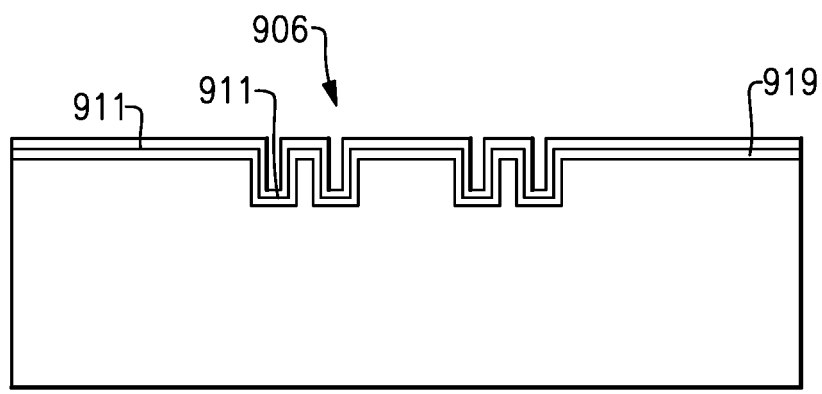

FIG. 9C shows the depositing of a piezoelectric material 911, as described in relation to FIG. 8B. As shown, the gaps in the structure are also lined with the deposited piezoelectric film layer 911. It will be appreciated that the figures are not to scale, and are for illustrative purposes only, such that the scale between the piezoelectric film layer in the gaps and the piezoelectric film layer on the rest of the surface of the device is not accurate. As illustrated, after the depositing of the piezoelectric film layer 911, there is still a gap in the structure, such that there is a corrugated portion 906. As shown, the non-etched section in the center of the device, in the cross-sectional view, forms the connecting region 908.

Figure 9D:
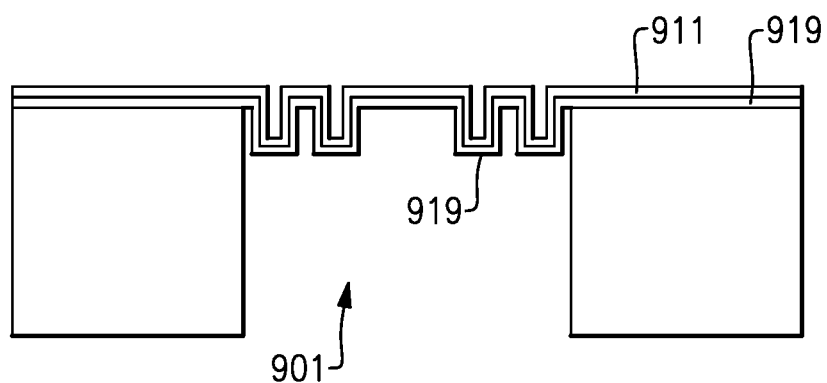

FIG. 9D illustrates the etching of the silicon substrate from the underside of the device to define a cavity. This process is the same as described in relation to FIG. 8D, in which an anisotropic etch is used. In this step an etchant is chosen such that the silicon is removed, but the silicon dioxide remains.

Figure 9E:
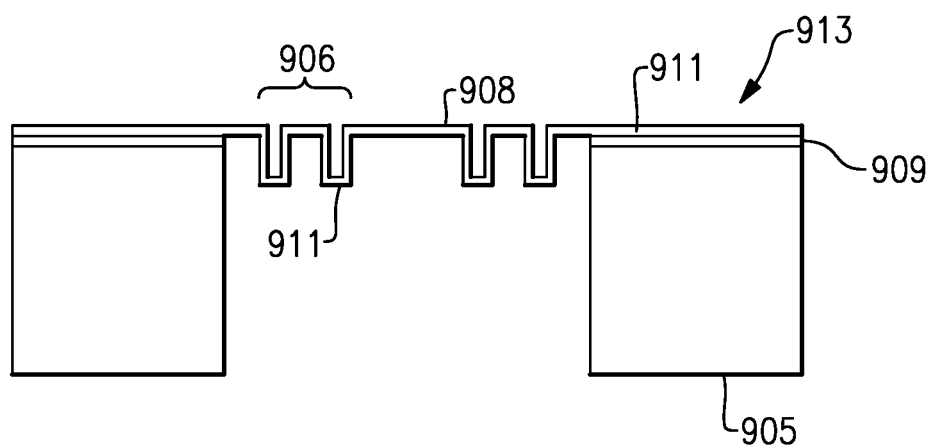

FIG. 9E illustrates the final step of the method, in which the silicon dioxide is etched, as described in relation to FIG. 8E. As shown, the silicon dioxide is removed from the underside of the piezoelectric film layer 911, leaving behind corrugated portions 906, a connecting region 908, and cavity walls 905. An insulating layer 909, comprising silicon dioxide, remains between the piezoelectric film layer 911 and the cavity walls 905, at the anchor region 913.

FIGS. 10A-10D show more detailed illustrations of cross-sectional views of the corrugated portion 1006, the connecting region 1008, and the piezoelectric film layer 1011 taken along line A of FIG. 4A. It will be noted that the methods as described in FIGS. 8A-8E and 9A-9E may be varied to form devices comprising any of the corrugated portions of FIGS. 10A-10D.

Figure 10A:
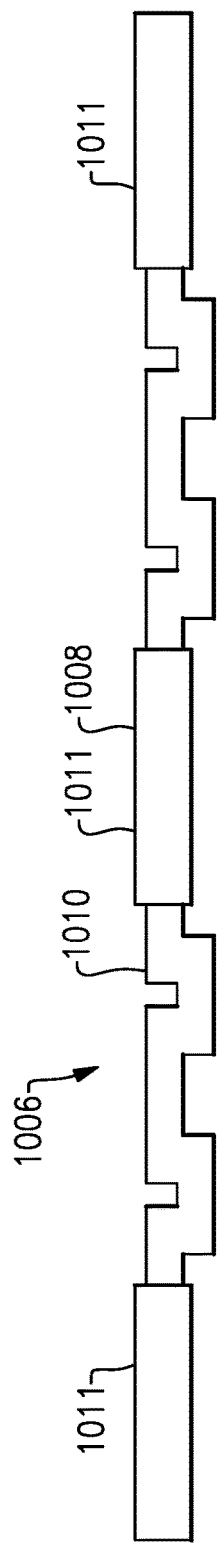
FIG. 10A-10D are cross-sectional views of corrugated portions of a microphone cantilever according to aspects disclosed herein.
Figure 10B:
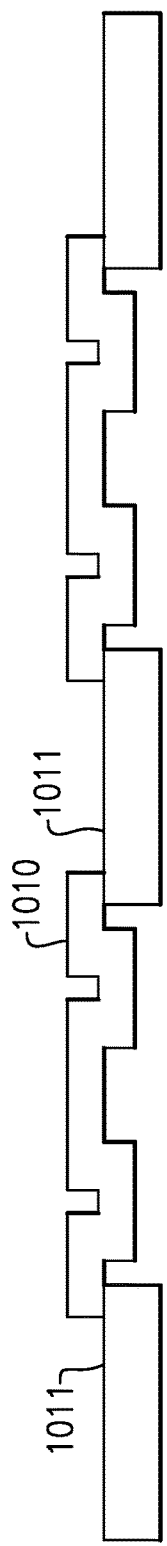

FIGS. 10A and 10B illustrate embodiments in which the corrugated portion is a different material 1010 than that of the piezoelectric film layer. As shown in FIG. 10A, in some embodiments the material 1010 may be deposited during electrode deposition, i.e., deposited while the one or more piezoelectric film layers, and the one or more electrode layers are deposited on the substrate or oxide layer. Therefore, this step would be carried out during the step of FIG. 8B described above, in which instance the step of FIG. 8C would not be required. Therefore, as shown, the corrugated material may be in line with the piezoelectric film layer 1011.

As shown in FIG. 10B, in some embodiments the material 1010 may be deposited after the one or more piezoelectric film layers and one or more layers of electrodes have been deposited. Therefore, as shown, the material 1010 may be overlapping the piezoelectric film layer 1011 of the connecting region 1008 and of the piezoelectric film layer of each of the cantilevers.

Figure 10C:
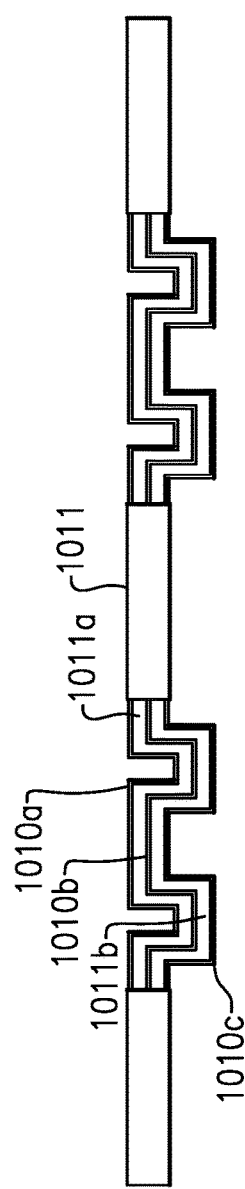

FIG. 10C illustrates an embodiment in which the corrugated portion is composed of two piezoelectric film layers 1011*a* and 1011*b*, and three layers of other material 1010*a*, 1010*b*, and 1010*c*. As shown, the layers are alternating and stacked on top of each other. The material 1010 may be any suitable material, such as a metal. In some embodiments the material 1010 may be the same material as the electrodes used elsewhere in the device. The electrodes, and the multiple layers of piezoelectric film layer found on the cantilevers are not illustrated here for simplicity, and the electrodes are positioned adjacent to the anchor region, and therefore may not extend to the edge of the corrugated portion. The layers may be deposited during the deposition of the piezoelectric film layers 1011 and the electrodes of the cantilever, as described elsewhere, such as with respect to FIGS. 9A-9E. Or the layered material may be deposited in a subsequent step, as described in relation to FIG. 8C.

Figure 10D:
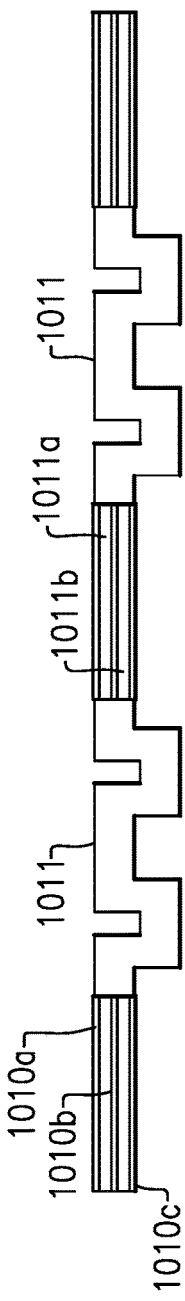

FIG. 10D illustrates an embodiment in which the corrugated portion comprises a piezoelectric film layer 1011. In this embodiment the connecting region, and the cantilevers comprise two piezoelectric film layers 1011*a* and 1011*b*, and three layers of other material 1010*a*, 1010*b*, and 1010*c*. As shown, the layers are alternating and stacked on top of each other. The material 1010 may be any material, such as the same material as the electrode.

It will be noted that there may be other embodiments not illustrated here, comprising any combination of layers described herein. The layers may be formed during or after the depositing of the piezoelectric film layers and electrodes of the cantilever. Alternatively, the material may be deposited in a solid form, and etched into a corrugated structure in a separate step.

FIG. 11 is a schematic diagram of one embodiment of a wireless device 1100. The wireless device can be, for example, but not limited to, a portable telecommunication device such as, a mobile cellular-type telephone. The wireless device includes a microphone arrangement 1100, including an improved microphone as described herein in relation to FIGS. 4A to 10D, and may include one or more of a baseband system 1101, a transceiver 1102, a front end system 1103, one or more antennas 1104, a power management system 1105, a memory 1106, a user interface 1107, a battery 1108, and audio codec 1109. The microphone arrangement may supply signals to the audio codec 1109 which may encode analog audio as digital signals or decode digital signals to analog. The audio codec 1109 may transmit the signals to a user interface 1107. The user interface 1107 transmits signals to the baseband system 1101. The transceiver 1102 generates RF signals for transmission and processes incoming RF signals received from the antennas.

The transceiver 1103 aids in conditioning signals transmitted to and/or received from the antennas 1104.

The antennas 1104 can include antennas used for a wide variety of types of communications. For example, the antennas 1104 can include antennas 1104 for transmitting and/or receiving signals associated with a wide variety of frequencies and communications standards.

The baseband system 1101 is coupled to the user interface to facilitate processing of various user input and output, such as voice and data. The baseband system 1101 provides the transceiver 1102 with digital representations of transmit signals, which the transceiver 1102 processes to generate RF signals for transmission. The baseband system 1101 also processes digital representations of received signals provided by the transceiver 1102. As shown in FIG. 11, the baseband system 1101 is coupled to the memory to facilitate operation of the wireless device.

The memory can be used for a wide variety of purposes, such as storing data and/or instructions to facilitate the operation of the wireless device and/or to provide storage of user information.

The power management system 1105 provides a number of power management functions of the wireless device.

The power management system 1105 receives a battery voltage from the battery 1108. The battery 1108 can be any suitable battery for use in the wireless device, including, for example, a lithium-ion battery.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A piezoelectric microelectromechanical systems microphone, comprising:
    a substrate including walls defining a cavity, at least two of the walls each defining a respective anchor region;
    a piezoelectric film layer defining at least two beams, each respective beam supported by the substrate at each anchor region, the at least two beams being free along a portion of their respective lengths and connected at a connecting region away from the respective anchor regions, the at least two beams including corrugated portions adjacent the connecting region; and
    an electrode disposed over the piezoelectric film layer.

2. The microphone of claim 1 wherein the at least two beams are connected by a solid material at the connecting region.

3. The microphone of claim 1 wherein the connecting region is composed of at least one piezoelectric film layer.

4. The microphone of claim 1 wherein the connecting region is composed of alternating layers of metal and piezoelectric film.

5. The microphone of claim 1 wherein the connecting region has a width of 20 to 50 micrometers.

6. The microphone of claim 1 wherein the at least two beams are connected by forming the at least two beams and the connecting region from a single layer of piezoelectric material.

7. The microphone of claim 1 wherein the corrugated portions are not overlaid with the electrode.

8. The microphone of claim 1 wherein the corrugated portions are composed of piezoelectric material.

9. The microphone of claim 1 wherein the corrugated portions are composed of a combination of piezoelectric material and metal.

10. The microphone of claim 1 wherein the corrugated portions are composed of metal.

11. The microphone of claim 1 wherein the corrugated portions are composed of a same material as the electrode.

12. The microphone of claim 1 wherein the electrode is adjacent to an anchor region.

13. The microphone of claim 1 wherein the microphone comprises an additional piezoelectric film layer.

14. The microphone of claim 13 having an additional two electrodes.

15. The microphone of claim 1 wherein a distance between an edge of the anchor region of one of the at least two beams to the edge of the anchor region of an opposite one of the at least two beams is around 780 micrometers.

16. A method of making a piezoelectric microelectromechanical systems microphone, the method comprising:
    depositing a piezoelectric film layer over a substrate;
    forming a corrugated portion during the depositing of the piezoelectric film layer; and
    etching the piezoelectric film layer to define at least two beams, each respective beam of the at least two beams including an anchor region, each respective beam being supported by the substrate at the respective anchor region, the at least two beams being free along a portion of their respective lengths and connected at a connecting region away from the respective anchor regions.

17. The method of claim 16 wherein the forming of the corrugated portion comprises:
    etching multiple trenches in the substrate from a front side;

oxidizing the front side of the substrate to form an oxide layer;
depositing a piezoelectric film layer over the oxide layer;
etching the substrate from the back side; and
etching the oxide layer from the back side.

18. The method of claim 17 wherein the forming of the corrugated portion further comprises depositing at least one electrode before or after depositing the piezoelectric film layer.

19. The method of claim 16 further comprising depositing at least one electrode after the depositing the piezoelectric film layer.

20. A wireless mobile device comprising:
one or more antennas;
a front end system that communicates with the one or more antennas; and
one or more piezoelectric microelectromechanical systems microphones, each microphone including a substrate including walls defining a cavity and at least two of the walls defining a respective anchor region each, a piezoelectric film layer defining at least two beams, each respective one of the at least two beams supported by the substrate at each anchor region, the at least two beams being free along a portion of their respective lengths and connected at a connecting region away from the respective anchor regions, the connecting region being composed of alternating layers of metal and piezoelectric film, and an electrode disposed over the piezoelectric film layer.

* * * * *